United States Patent
Ghetzler et al.

[11] Patent Number: 5,942,682
[45] Date of Patent: Aug. 24, 1999

[54] APPARATUS TO SIMULATE AERODYNAMIC COOLING AND HEATING EFFECTS ON AIRCRAFT/MISSILE EQUIPMENT

[75] Inventors: Richard Ghetzler, Buffalo Grove; Kim D. Volendorf, Cary, both of Ill.; Donald A. Sofia, Sheboygan, Wis.; Terrance W. Mollison, Wheeling, Ill.

[73] Assignee: Northrop Grumman Corporation, Los Angeles, Calif.

[21] Appl. No.: 09/017,429

[22] Filed: Feb. 2, 1998

[51] Int. Cl.$^6$ .............................. G01M 9/00; G01N 17/00
[52] U.S. Cl. .............................................. 73/147; 73/865.6
[58] Field of Search ..................... 73/147, 865.6

[56] References Cited

U.S. PATENT DOCUMENTS

| | | | |
|---|---|---|---|
| 2,309,938 | 2/1943 | Diserens et al. | 62/178 |
| 2,439,806 | 4/1948 | Heineman | 73/1 |
| 2,510,952 | 6/1950 | Brewster | 257/9 |
| 3,027,760 | 4/1962 | Holderer | 73/147 |
| 3,121,329 | 2/1964 | Bennett | 73/147 |
| 3,230,764 | 1/1966 | Bloxsom, Jr. et al. | 73/147 |
| 3,709,026 | 1/1973 | Rhodes et al. | 73/12 |
| 3,903,740 | 9/1975 | Baldwin | 73/147 |
| 3,960,000 | 6/1976 | Barnett et al. | 73/15.4 |
| 4,309,901 | 1/1982 | Rolinski et al. | 73/147 |
| 4,534,216 | 8/1985 | Fasano et al. | 73/147 |
| 5,501,101 | 3/1996 | Purcell | 73/147 |

*Primary Examiner*—Harshad Patel
*Attorney, Agent, or Firm*—Terry J. Anderson; Karl J. Hoch, Jr.

[57] ABSTRACT

Apparatus for simulating aerodynamic heating and cooling on the outer surface of equipment externally mounted on an aircraft or missile as if airborne and exposed to an air stream. A first proximately spaced enclosure substantially uniformly conforms to the outer surface of the equipment and defines a low pressure chamber. A second enclosure envelops the first enclosure and defines a high pressure chamber. An adjustable flow producing mechanism directs flow of pressurized inlet air into the high pressure chamber. A temperature control mechanism selectively heats and cools the inlet air. Vents in the second enclosure exhaust the air from the low pressure chamber to the ambient region and a plurality of spaced orifices in the first enclosure direct jets of the pressurized air from the high pressure chamber into the low pressure chamber which vigorously impinge on the outer surface of the equipment. A first sensor measures the temperature of the air in the high pressure chamber and generates a first proportional signal and a second sensor measures the heat transfer coefficient at a plurality of locations on the outer surface of the equipment and generates a second proportional signal. A processor containing known information concerning the temperature and heat transfer properties of the equipment if airborne and exposed to an air stream under specified operating flight conditions compares the first and second signals with the known information and operates the flow producing and temperature control mechanisms until the signals conform to the known information.

12 Claims, 2 Drawing Sheets

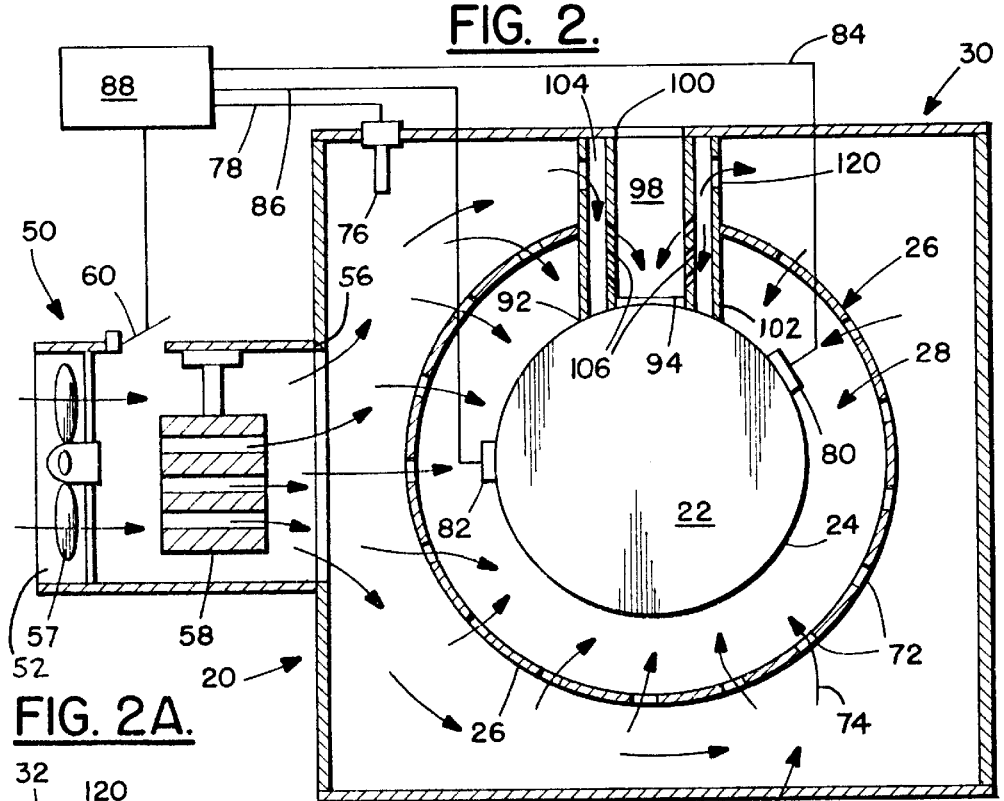
FIG. 2.
FIG. 2A.
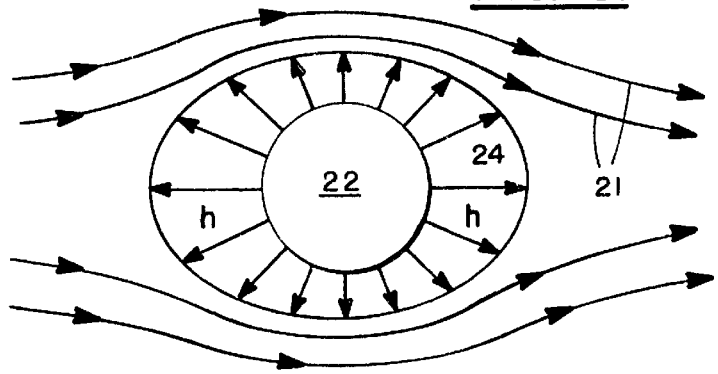
FIG. 3.
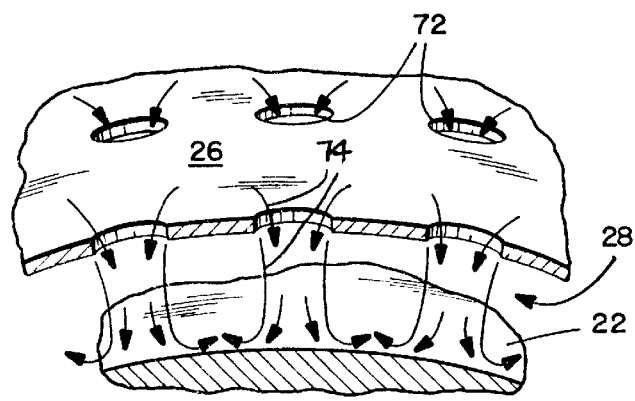
FIG. 4.

APPARATUS TO SIMULATE AERODYNAMIC COOLING AND HEATING EFFECTS ON AIRCRAFT/MISSILE EQUIPMENT

BACKGROUND OF THE INVENTION

1. Field of the Invention

The present invention relates generally to apparatus for simulating, as if airborne and exposed to the air stream, aerodynamic heating and cooling effects on equipment intended for placement externally of an aircraft or missile.

2. Description of the Prior Art

Apparatus used to simulate aircraft or missile operating conditions while on the ground have long been used. A number of these which have been disclosed in the patent literature will now be discussed.

U.S. Pat. No. 3,960,000 to Barnett et al., "Flight Simulator for Missiles", includes means for directing heat toward the nose cone of a missile while imparting rotation to the missile, simulating the flight conditions of spinning missiles. The heat source typically takes the form of an oxygen gas flame controlled by a controller. An IR detector cell monitors the actual heat (temperature) reached at the surface of the nose cone.

The present invention differs from Barnett et al. in several key respects. The goal of Barnett et al. is to heat the surface of the nose cone to temperatures predicted or measured during test. It is not a goal to also match the correct corresponding convective heat transfer coefficient with the flight conditions. This is not critical in the typical fiberglass or other insulative type nose cone tipped missile where the heat from Internal electronics would not be rejected through the nose cone. Instead, one of the nose cone's main purpose is to protect by insulation the electronics (a fuse in the case of Barnett et al.) from the aerodynamic heating experienced by a high speed missile.

In contrast, the present invention has, as one object, the goal of accurately producing the convective heat transfer coefficient produced by the air stream in cases where the air stream is used to cool the electronic equipment which has a surface or surfaces exposed to the air stream for this purpose. In less technical terms, correctly simulating this coefficient will correctly model the resistance of heat entering from air stream (aerodynamic heating) or leaving the flight vehicle into the air stream (aerodynamic cooling) when internal heat is being generated. In practical cases where the heat is being rejected into the air stream i.e. from electronics, the surface of a flight vehicle will be heated by both the electronic heat sources and the air stream until the surface temperature is greater than the air stream adiabatic wall temperature so that the generated heat is rejected at the rate of the electronic dissipation.

Considering the effects of aerodynamic heating and the inherent temperature limitations of electronics, this skin temperature is limited to a maximum of about 100° C. Corresponding flight speeds would be limited to high subsonic at low altitudes to moderate supersonic speeds of Mach=2.0 at altitude. This of course is the speed range for the majority of all commercial and military aircraft and one object of the present invention is provide the aero-heating and cooling effects for equipment for this broad spectrum of flight vehicles.

In contrast, by the nature of its oxygen gas heat source, Barnett et al. addresses a smaller class of applications than the present invention, primarily high speed missiles reaching Mach=2.5 (adiabatic wall temperatures of 220° C. or higher) where the high temperatures provided by this type of heat source are required.

U.S. Pat. No. 3,709,026 to Rhodes et al., "Apparatus and Method for Simulating Spacecraft Erosion" discloses missile/spacecraft testing equipment. This invention has the means to simulate the effects of high speed flow, including heating and impact with particulate in the atmosphere on a test object made of materials which are under consideration for the external surfaces of a space craft entering or leaving the earth's atmosphere. Particulate include dust, rain, ice particles, vapor and micro-meteorites. Effects of the complete flight environment on heat shield materials, antennas, optical windows and like materials which are of interest to designers of high speed rocket vehicles entering or leaving the earth's atmosphere can be simulated.

Specifically the Rhodes et al. invention has a plurality of accelerator nozzles means positioned on and protruding through the walls of spherical thick walled housing made of metals which is capable of withstanding the test pressures and high temperatures (up to 5,000° F.). Each of nozzle accelerators can independently accelerate air under high pressure to stream of high velocity air heated to high temperatures, simulating atmospheric heating, while injecting any of the above particulate as desired into the stream to impact on the test object.

The test object is mounted to a stage with associated mechanisms which can position the test object sequentially in front of a group of these accelerator nozzles, each operating at various conditions to simulate the time history of the trajectory of the flight vehicle entering or Leaving the earth's atmospheric conditions to simulate the time history of the trajectory of the flight vehicle entering or leaving the earth's atmosphere.

The present invention differs substantially from Rhodes et al. in function. The air stream emanating from the accelerating nozzles in the patent immerses the test object in the full free stream air velocity that would be encountered in flight. To accomplish this necessitates that the nozzle and emanating air stream is slightly larger than the test object. Since the nozzle is only a fraction of the size of the test chamber for flow purposes only a small scale model could be tested with a reasonably sized bench top test chamber. However, one goal of the present invention is to be able to test full scale actual electronic equipment in aircraft and missiles where a portion or all of the equipment boundaries are exposed to the air stream. If the structure of Rhodes et al. is reduced to one large nozzle within the chamber, the flow rates required will be at least an order of magnitude larger than the present invention, functioning like a wind tunnel requiring use of much larger compressors, greater power consumption and a much larger and expensive chamber to produce the actual flight conditions, than required by the present invention. Additionally the present invention can simulate changing flight conditions without use of the expensive positioning mechanisms used in Rhodes et al. This is accomplished in the present invention by changing the pressure and heating of the air flow supplied to the test article housing.

U.S. Pat. No. 3,230,764 to Bloxsom, Jr. Et al., "Method of Determining Heat Transfer Rates and Temperature Conditions", is directed toward an optical sensor means for measuring the heat transfer rates and temperatures reached in the very short test time available for test models in a hypersonic pulse type wind tunnel. This type of wind tunnel can only provide test simulation on the order of a millisecond. The optical sensor means is based on the change in the refractive index of many plastic compositions including acrylics with temperature. The test model is coated with this type of sensor material and post test examination can determine the amount of heating by the depth of the plastic experiencing a change of refractive index. Optical interference methods are used for this determination. As opposed to the present invention, Bloxsom et al. does not simulate the heat transfer between the air stream and test model but instead measures the result and in this manner is distinguished from the present invention.

U.S. Pat. No. 3,121,329 to Bennett, "Simulation of Reentry Conditions". employs means which produces streams of partially ionized gas at speeds characteristic of orbiting satellites within an evacuated space simulating enviromnental conditions of the upper atmosphere and outer space. These means include projecting a source of positive nitrogen ions through the cover into the cylindrical member at about 5000 volts into a nitrogen gas which is then accelerated to orbital velocities by collisions with the ions. A nozzle then directs this stream of accelerated nitrogen toward the front of the test model whereby reentry gas dynamic conditions can be closely simulated.

The Bennett invention is a very complex and expensive apparatus which uses a combination of expedients including use of using high voltage means to produce and accelerate nitrogen ions and thereby gaseous nitrogen to at least orbital velocities. The present invention has as a goal and the means to simulate aerodynamic heating and cooling at the velocities of the majority of air flight vehicles rather than space vehicles i.e. subsonic through low supersonic rather than reentry and in this broad manner may be distinguished from Bennett.

U.S. Pat. No. 3,027,760 to Holderer, "Adjustable Porous Walls for Wind Tunnels", has primary application to transonic wind tunnels and introduces variable perforation means in wall means to absorb shock waves emanating from a test model. A solid wall would reflect the shock waves back toward the model interfering with the intent to simulate the flow over the model that would occur in flight through the atmosphere. The perforations allow a means of escape of the compressed air from a shock wave into an outer chamber which absorbs the energy from the wave. The outer chamber requires significant air flow which is thereby minimized by the ability to vary the perforation size depending on the strength of the shock waves.

The invention of Holderer can be easily be distinguished from the present invention, in that the patent has an object to enhance the accuracy of the air flow in a wind tunnel. In contrast, the present invention has as an object to replicate the cooling and heating effects of air flow around a unit under test by the disclosed means without using a wind tunnel Again this approach will only use a small fraction of the air flow and compressor size and power of a wind tunnel.

U.S. Pat. No. 2,510,952 to Brewster, "Temperature Testing Chamber", discloses means to closely regulate the air temperature in a ground pressure testing chamber for equipment preventing sudden temperature excursions. The invention uses valve and ducting means to separately re-circulate from the chamber through the cooling and heating means where the temperature of the test chamber can be accurately raised or lowered without significant temperature overshoot. Brewster can be distinguished from the present invention in that its capability is limited to temperature control only and can not simulate the heating or cooling effects on a test article from the air stream during flight.

U.S. Pat. No. 2,439,806 to Heineman, "Testing Chamber", discloses means to perform testing of equipment and personnel at simulated high altitude conditions. The invention of Heineman introduces a thin metallic membrane into the insulated walls to prevent migration of moisture and damage to the insulation. The Invention of Heineman can be distinguished from the present invention in that its capability is limited to temperature, altitude, and humidity control and can not simulate the heating or cooling effects on a test article from the air stream during flight.

U.S. Pat. No. 2,309,938 to Diserens et al., "Cooling System for Wind Tunnels or Similar Enclosures", discloses means to cool large air flow rates required by wind tunnels down to simulated high altitude conditions without adding significant blockage and flow resistance in the form of cooling coils or other direct contact cooling apparatus in the wind tunnel loop. The means includes an external air liquefaction system which accumulates liquid air and then sprays the liquid at as high rates as needed through a distribution manifold into the air upstream of the test section. Compared to cooling coils, the spray system adds little flow impedance, while delivering a substantial cooling effect.

Diserens et al., can be distinguished from the present invention in that the means and goals of the patent are limited to providing cooling of air flowing through the wind tunnel In contrast, the present invention simulates the cooling and heating effects of the air flow on airborne equipment at high speeds. In addition, the air flow rate needed by the present invention is only a small fraction of that required by a wind tunnel.

It was with knowledge of the foregoing state of the technology that the present invention has been conceived and is now reduced to practice.

SUMMARY OF THE INVENTION

The present invention relates to apparatus to simulate aerodynamic cooling and heating effects on aircraft/missile equipment. The test apparatus employs a test chamber through which relatively low volumes, compared to a wind tunnel, of temperature controlled air are passed. The chamber is not much larger than the equipment being tested and includes a multi-orifice baffle and contains the device(s) under test. Clear optical paths are included to enable determination of the air stream thermal effects on optical elements if they are part of the equipment. Actual flight conditions are realistically and economically simulated.

In another manner of description, the present invention concerns apparatus for simulating aerodynamic heating and cooling on the outer surface of equipment externally mounted on an aircraft or missile as if airborne and exposed to an air stream. A first proximately spaced enclosure substantially uniformly conforms to the outer surface of the equipment and defines a low pressure chamber with respect to ambient conditions. A second enclosure envelops the first enclosure and defines a higher pressure chamber relative to the low pressure chamber. An adjustable flow producing mechanism including a variable exhaust valve to control pressure directs flow of pressurized inlet air into the higher pressure chamber. A temperature control mechanism selectively heats or cools the inlet air supplied to the higher pressure chamber. Vents in the second enclosure exhaust the air from the low pressure chamber to the ambient region and a plurality of spaced orifices in the first enclosure direct jets of the pressurized air from the high pressure chamber into the low pressure chamber which vigorously impinge on the outer surface of the equipment. A first sensor measures the temperature of the air in the high pressure chamber and generates a first proportional signal and a second sensor measures the heat transfer coefficient at a plurality of locations on the outer surface of the equipment and generates a second proportional signal. A processor containing known information concerning the temperature and heat transfer properties of the equipment if airborne and exposed to an air stream under specified operating flight conditions compares the first and second signals with the known information and operates the flow producing and temperature control mechanisms until the signals conform to the known information.

A primary feature, then of the present invention is the provision of apparatus for simulating, as if airborne and exposed to the air stream, aerodynamic heating and cooling effects on equipment intended for placement externally on an aircraft or missile or internal to the aircraft or missile and having an external surface exposed to the air stream.

The invention, at least in its preferred embodiments, aims to provide the capability:

(a) to simulate accurately the effects of the air stream on aerodynamic cooling and heating of airborne equipment (including electronic equipment) exposed to the air stream;

(b) of allowing (a) to be achieved without resorting to expensive wind tunnel testing, and able to simulate low subsonic through supersonic flight speeds; and (c) of simulating both steady state and transient flight conditions;

Another feature of the present invention is the provision of improved simulation apparatus which includes (a) flow and pressure control means; (b) inlet temperature control means; (c) means to direct air flow to the external surface of the equipment; (d) means to apply forced convection coefficient boundary conditions corresponding to flight conditions; (e) sensors to measure the applied convection coefficient; and (f) an associated processor to control (a) and (b) to achieve (d) in a predetermined manner as measured by (f) and thereby simultaneously simulate with accuracy the thermal effects of the air stream on the equipment.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 2 is a cross section view taken generally along line 2—2 in FIG. 1;

FIG. 2A is a detail cross sectional view of parts illustrated in FIG. 1;

FIG. 3 is a diagrammatic end elevation view of the equipment illustrated in FIGS. 1 and 2 as if airborne and exposed to an air stream; and FIG. 4 is a detail perspective view illustrating the vigorous impinging action of air jets of pressurized air from the high pressure chamber of the simulation apparatus illustrated in FIGS. 1 and 2 and directed into the low pressure chamber so as to vigorously impinge on the outer surface of the equipment.

DETAILED DESCRIPTION OF THE PREFERRED EMBODIMENTS

Figure 1:
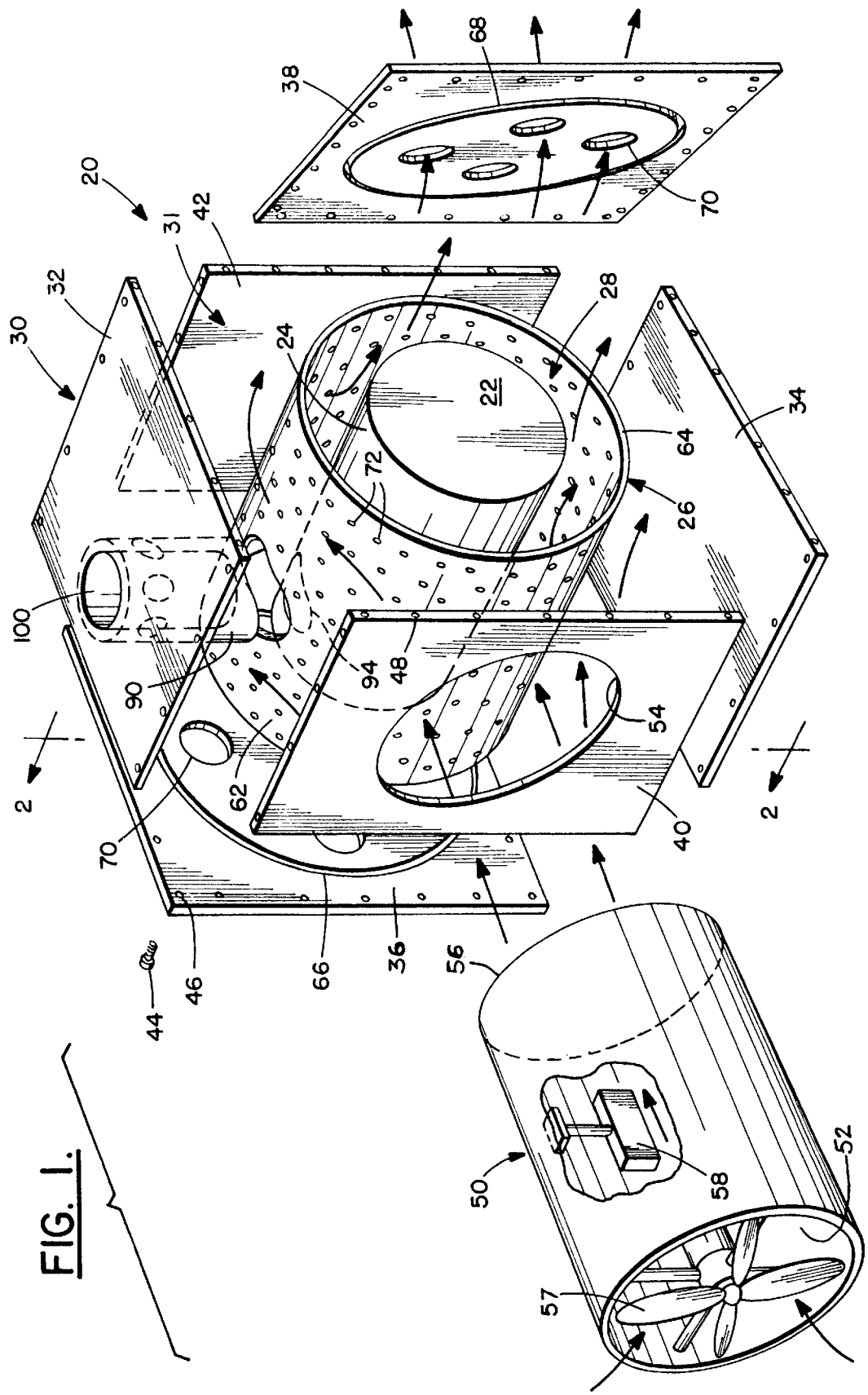
FIG. 1 is an exploded perspective view of simulation apparatus embodying the present invention.

Turn now to the drawings and, initially, to FIGS. 1 and 2 which generally illustrate apparatus 20 for simulating, as if airborne and exposed to an air stream 21 (FIG. 3), aerodynamic heating and cooling on equipment 22 having an outer surface 24. Presently development of electronic or other equipment which is exposed to or uses the air stream to provide cooling, when mounted to external aircraft or missile skins, makes extensive use of expensive computer modeling or wind tunnels to study the effects of actual flight on the equipment. The present invention uses a small fraction of the power and flow rate as compared to that required by a wind tunnel, and the apparatus is much smaller and less expensive than a wind tunnel to build and operate and is able to identify actual environmental effects not amenable to computer modeling. FIGS. 1 and 2 illustrate the basic embodiment to demonstrate the main features and principles of operation. The specific apparatus illustrated is devised to cool or heat the specific cylindrically shaped electronic equipment exposed to the air stream shown in FIG. 3, but the invention applies to any shape. The specific embodiment shown also applies to a half cylinder protruding from the aircraft or missile skin. The expected heat transfer varies around the circumference of the cylinder and is proportional to the heat transfer coefficient, h, shown in FIG. 3. The heat transfer data for the shape illustrated and for other simple shapes such as flat plates, spheres, and the like has been correlated and is readily available in published heat transfer literature. For more complex aerodynamic shapes, advanced analytical techniques, including Computational Fluid Dynamics (CFD), are readily available to calculate h. In both of the above cases, h can be correlated with a Reynolds number and with a Prandtl number.

The invention is able to duplicate these cooling boundary conditions for any flight condition with the following principle of operation and elements.

The air flow is supplied at the appropriate velocity and pressure by a blower or other means at the air inlet, and is heated or cooled to the boundary layer recovery temperature $T_r$ given by $$T_r = T_a[1+(\gamma-1)/2 \cdot R M^2]$$

where:

$T_r$=T recovery $T_a$=T ambient temperature (static)

R=Recovery factor

γ=specific heat of air

M=flight Mach number to be simulated.

Returning to FIGS. 1 and 2, the apparatus 20 is seen to include a first enclosure 26 substantially uniformly conforming to, and proximately spaced from, the outer surface 24 of the equipment 22. A low pressure chamber 28 results intermediate the outer surface 24 of the equipment 22 and the first enclosure 26.

A second enclosure 30 envelops the first enclosure 26 and defines a high pressure chamber 31 intermediate the first enclosure and the second enclosure. In actual fact, the second enclosure may be comprised of a plurality of mutually opposed walls 32 and 34, 36 and 38, 40 and 42. In any suitable manner, the opposed walls 32–42 may be sealingly fastened together with the aid of fasteners 44, through holes 46, and associated fastening bores 48.

An adjustable flow producing component 50 is operable for directing flow of pressurized inlet air into the high pressure chamber 31. The component 50 includes an air entry duct 52 attached to the second enclosure 30 in any suitable manner. Specifically, the wall 40 is formed with an intake aperture 54 shaped and sized to conform to a terminal rim 56 of the component 50. When so attached to the wall 40, the component 50 provides fluid communication between the ambient region surrounding the apparatus 20 and the high pressure chamber 31. A flow producing mechanism, preferably in the form of an impeller 57, is provided for driving air from the ambient region into the high pressure chamber 31.

The flow producing component 50 also includes a suitable temperature control appliance 58 which may be a heater for heating the air or a cooler for cooling the air as it flows from the ambient region to the high pressure chamber 31. An exhaust valve 60 is also provided in the entry duct 50 for selectively permitting air to flow from the entry duct back to the ambient region, and to adjust the pressure in the high pressure chamber 31 may be provided to measure.

Opposite ends 62, 64 of the first enclosure 26 are sealingly engaged with the opposed walls 36, 38, respectively. To assure optimum sealing effect, the wall 36 may be formed with an annular groove 66 for fittingly receiving the end 62 and the wall 38 may be formed with an annular groove 68 for fittingly receiving the end 64 with o-ring seals (not shown) or the like positioned in the grooves. Additionally, the second enclosure 30 has a plurality of vents 70 for exhausting to the ambient region the air from the low pressure chamber 28.

Viewing especially FIG. 4, the first enclosure 26 has a plurality of spaced orifices 72 therein for directing jets 74 of the pressurized air from the high pressure chamber into the low pressure chamber which vigorously impinge on the outer surface 24 of the equipment 22. A first sensor 76 is provided for measuring temperature of the air in the high pressure chamber 31 and is operable for generating a first signal proportional thereto as represented by a lead 78 (FIG. 2). A plurality of second sensors 80, 82 are provided for measuring the heat transfer coefficient at a plurality of spaced locations on the outer surface 24 of the equipment 22 and each generates a second signal proportional thereto as represented by leads 84, 86, respectively. (FIG. 2).

A third sensor maybe provided to measure the pressure in the high pressure chamber 31 and generate a proportional signal. The speed of the jets 74 and vigor of the cooling effect increases with the pressure of chamber 31.

A suitable electronic processor 88 contains known information concerning the temperature and heat transfer properties of the equipment 22 if airborne and exposed to an air stream under specified operating flight conditions. The processor compares the first and second signals with the known information and operates the flow producing component 50, exhaust valve 60, and the temperature control appliance 58 until the first signal 78 and the second signals 80, 82 conform to the known information. In this manner, the aerodynamic heating and cooling effects of the air stream 21 on the equipment 22 are accurately simulated for the specified operating flight conditions.

For purposes of the invention, the first enclosure 26 is substantially uniformly spaced from the equipment 22 a distance generally in the range of 1 inch to 1½ inches Additionally, the orifices 72 in the first enclosure 26 have a projected area in the general range of 1/64 square inches to 1/100 square inches and have a center to center spacing between adjacent orifices in the general range of ¾ inch to 1¼ inch.

In the operation of the apparatus 20, the air enters the high pressure chamber 31 which is large enough to provide close to a stagnant low velocity) flow region. From this region, the air flow is forced by virtue of the high pressure, through the small orifices 72 which greatly accelerate the flow velocity and thereby produce small high speed jets 74 of air flow which provide impingement cooling at the surface 24 of the equipment 22. The impingement cooling establishes convective cooling or heating conditions to the surface of the equipment which is a function of orifice Reynolds number, gap diameter, spacing to the surface, and spacing between orifices, where:

Reynolds Number, $R_e = U(2r_o)/\nu$, $h = f(R_e, r_o/b, z_o/b, P_r)$, $P_r$ = Prandtl Number, U = orifice entrance velocity, $r_o$ = radius of cooling orifices, b = spacing of orifice outlet to cooling surfaces, $z_o$ = spacing between orifices, and $\nu$ = kinematic viscosity.

Orifice spacing, orifice size, flow rate, and air supply pressure to high pressure chamber 31 may be related to provide the correct orifice spacing to match the cooling for the specific geometry of the equipment 22 of FIGS. 1 and 2 or any other candidate shape. The use of impingement cooling is widespread in industrial and aerospace applications including cooling of gas turbine compressor blades, but has not been employed for simulation purposes as in the present invention. The methodology to achieve the desired heat transfer coefficient for applications of the present invention to specific equipment under specified flight conditions is well known in the field. In most cases, the goal of the invention is to establish worst case environmental aerodynamic heating and cooling conditions for the equipment to be tested, i.e. lowest temperatures and highest heat transfer when operation and durability of the equipment under cold conditions is of interest. Conversely, if the durability in operation under hot conditions is of interest, then the invention will provide the appropriately heated air temperature, flow rate, and pressure to achieve the highest jet transfer coefficient and highest air temperature. With the development of high speed aircraft, methodology to predict or estimate the heat transfer coefficient for flight conditions on aircraft surfaces has also been well developed and is available in the established literature and is applicable to the present invention.

To confirm that the required heat transfer coefficient has been obtained, standard hot film anemometers, or sensors 80, 82 are bonded or otherwise fastened to selected areas of the outer surface 24 of the equipment 22. From the measured electrical power supplied to the anemometer, and the measured temperature difference between the surface of the anemometer and the local air stream temperature, the local heat transfer coefficient can be calculated and the inlet flow rate and pressure adjusted until the desired value of h is reached.

The second sensors 80, 82 can be custom built out of standard components or is available commercially. Basically, the sensors 80, 82 comprise a standard film resistance heater, mounted on a base insulator. The film resistance heater's top surface is exposed to the air flow. The base insulator is constructed of a flexible (rubber) type insulator to allow mounting and accommodation in general of the curvature in the equipment's surface. The resistance of the film resistance heater is proportional to the temperature of the resistor material. With air flow established by the invention apparatus, a known measured quantity of electrical power is supplied to the sensor, and based on the temperature rise of the sensor above the air flow and the power applied, the local heat transfer coefficient is determined by:

$$h=Q/(T_s-T_a)A_s$$

where:
- h=local average heat transfer coefficient established between the heated sensor surface and air flow;
- Q=IV=power supplied to and dissipated by the sensor and is measured by I×V where:
- I=Current
- V=Voltage
- $T_s$=is the surface temperature of the sensor which is a linear function of the sensors resistance which in turn is measured by:

R=V/I where:
- R=sensor's electrical resistance (in ohms if V and I are in volts and amperes, respectively), at the powered operating temperature, $T_s$.

And since $R=R_0+C_1 (T_s-T_o)$, where:
- $R_0$ is the reference resistance at a reference temperature $T_o$, and $C_1$ is the temperature coefficient for resistance, the sensor film temperature is given by:

$$T_s=(R-R_o)/C_1+T_0.$$

And h is then determined from the measured data by:

$$h=Q/[(R-R_0) C_1+T_0-T_a]A_s,$$

or $$h=IV/[(R-R_0) C_1+T_0-T_a]A_s$$

where:
- $T_a$=the supply air temperature, is measured with a standard thermocouple, sensor 76; and
- $A_s$=the sensor area.

The sensor is so sized that the dimensions will be at least as great as the spacing between the impingement cooling orifices, in order to obtain the average value of h.

In a typical arrangement with one inch spacing between the conforming enclosure 26 and the equipment outer surface 24, orifices 1/8" in diameter spaced on 1" centers are able to simulate high speed aerodynamic heating and cooling on cylindrical and spherical-shaped equipment or aerodynamically shaped equipment anywhere from sea level to high altitude, for example, greater than 40,000 feet. To accomplish the required aerodynamic heat transfer effect up to high subsonic speeds, supply pressure range of 10 inches of water is sufficient. To expand operations to low to moderate supersonic speeds Less than approximately Mach 2.0), it is only necessary to increase the supply pressure to a range of about 20 inches to 30 inches of water.

After being received by the low pressure chamber 28, the flow exits through exhaust ports or vents 70, sized such that the flow impedance at the exhaust is low compared to the orifice impedance, whereby the pressure of the chamber 28 is dose to the ambient pressure.

Under transient conditions, the inlet flow pressure and temperature can be controlled by the processor 88 and associated operating components to simulate the time history of the convective heat transfer coefficient, while controlling the heating or cooling of the air to produce the corresponding air recovery temperature.

The embodiment shown is for one configuration; however, the invention is applicable to any size or shape, device or equipment exposed to the air stream.

In some cases the aircraft or missile equipment of interest may include optical systems which have optical elements exposed to the air stream. Of interest here would be the response and performance of these elements to the aerodynamic heating and cooling. During the simulated aerodynamic cooling and heating tests it will be advantageous to have a dear optical path to allow the transmission of energy and measurement in the case of optical transmitters or the reception of energy in the case of optical sensors. The present invention includes the means to accomplish this as also shown in FIGS. 1 and 2.

To this end, a first outer tubular optical duct 90 is integral with the first enclosure 26 and extends generally transverse thereto between a first end 92 engaged with the outer surface 24 of the equipment 22 and surrounding an electromagnetic transmitting and receiving element 94 on the outer surface of the equipment and a second end 96 engaged with the outer enclosure 30. A second inner tubular optical duct 98 is integral with the second enclosure 30 and is coaxial with and freely received within the first tubular optical duct 90. The second inner tubular optical duct 98 extends from an opening 100 in the second enclosure to an extreme rim 102 spaced from the outer surface 24 of the equipment 22 to define an annular region 104. The second inner tubular optical duct 98 includes a plurality of fixed cooling orifices 106 adjacent the extreme rim 102 angled for directing flow of air from the high pressure chamber 31 through openings 120 communicating with the annular region 104, then directed through the fixed orifices such that high pressure jets, similar to the jets 74 of FIG. 4 are caused to vigorously impinge on the outer surface of the electromagnetic transmitting and receiving element 94 on the outer surface of the equipment. After impinging, the air vents directly out to the ambient environment through the openings 100.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for simulating, as if airborne and exposed to an air stream, aerodynamic heating and cooling on equipment having an outer surface comprising:

a first enclosure substantially uniformly conforming to, and proximately spaced from, the outer surface of the equipment and defining a low pressure chamber intermediate the outer surface of the equipment and said first enclosure;

a second enclosure enveloping said first enclosure and defining a high pressure chamber intermediate said first enclosure and said second enclosure;

adjustable flow producing means operable for directing flow of pressurized inlet air into the high pressure chamber;

adjustable pressure control means operable to control the pressure of the air supplied to the high pressure chamber;

temperature control means operable for selectively heating and cooling the inlet air;

said second enclosure having a plurality of vents for exhausting to an ambient region the air from the low pressure chamber;

said first enclosure having a plurality of spaced orifices therein for directing jets of the pressurized air from the high pressure chamber into the low pressure chamber which vigorously impinge on the outer surface of the equipment;

first sensor means for measuring temperature of the air in the high pressure chamber and generating a first signal proportional thereto;

second sensor means for measuring the heat transfer coefficient at a plurality of locations on the outer surface of the equipment and generating a second signal proportional thereto; and third sensor means for measuring the heat transfer coefficient at a plurality of locations on the outer surface of the equipment and generating a third signal proportional thereto; and processor means containing known information concerning the temperature and heat transfer properties of the equipment if airborne and exposed to an air stream under specified operating flight conditions and comparing said first and second signals with the known information and operating said flow and pressure producing means and said temperature control means until said first, second, and third signals conform to the known information;

whereby the aerodynamic heating and cooling effects of the air stream on the equipment are accurately simulated for the specified operating flight conditions.

2. Apparatus as set forth in claim 1 wherein said first enclosure is substantially uniformly spaced from the equipment a distance generally in the range of ¾ inches to 1½ inches.

3. Apparatus as set forth in claim 1 wherein said adjustable flow producing means includes:

an air entry duct attached to said second enclosure providing communication between the ambient region and the high pressure chamber; and flow producing means for driving air from the ambient region into the high pressure chamber.

4. Apparatus as set forth in claim 3 wherein said flow producing means is an impeller.

5. Apparatus as set forth in claim 3 wherein said temperature control means includes a heater for heating the air or a cooler for cooling the air as it flows from the ambient region to the high pressure chamber.

6. Apparatus as set forth in claim 1 wherein the orifices in said first enclosure have a projected area in the general range of 1/64 square inches to 1/100 square inches and have a center to center spacing between adjacent orifices in the general range of ¾ inches to 1¼ inches.

7. Apparatus as set forth in claim 3 wherein said adjustable flow producing means includes:

an impeller for drawing air from the ambient region and driving it through said entry duct and into the high pressure chamber; and an exhaust valve in said entry duct for selectively permitting air to flow from said entry duct back to the ambient region thereby controlling the air pressure in the high pressure chamber.

8. Apparatus as set forth in claim 1 including:

a first tubular optical duct integral with said first enclosure and extending generally transverse thereto between a first end engaged with the outer surface of the equipment and surrounding an electromagnetic transmitting and receiving element on the outer surface of the equipment and a second end engaging said second enclosure;

a second tubular optical duct integral with said second enclosure and coaxial with and freely received within said first tubular optical duct, said second tubular optical duct extending from an opening in said second enclosure to an extreme rim spaced from the outer surface of the equipment to define an annular region, said second tubular optical duct including a plurality of fixed openings adjacent said extreme rim for directing flow of air from said high pressure chamber through the annular region, then directed through said fixed orifices such that high pressure jets are caused to vigorously impinge on the outer surface of the electromagnetic transmitting and receiving element on the outer surface of the equipment.

9. Apparatus as set forth in claim 1 including:

tubular optical duct means integral with said first and second enclosures and extending generally transverse thereto and surrounding an electromagnetic transmitting and receiving element on the outer surface of the equipment and defining an annular region and including a plurality of fixed openings proximate the outer surface of the equipment for directing flow of air from the high pressure chamber through the annular region, then directed through said fixed openings such that high pressure jets are caused to vigorously impinge on the outer surface of the electromagnetic transmitting or receiving element on the outer surface of the equipment.

10. A method of simulating aerodynamic heating and cooling on equipment comprising the steps of:

(a) providing a first enclosure substantially uniformly conforming to, and proximately spaced from, an outer surface of the equipment and defining a low pressure chamber intermediate the outer surface of the equipment and the first enclosure;

(b) enveloping the first enclosure with a second enclosure so as to define a high pressure chamber intermediate the first enclosure and the second enclosure;

(c) guiding pressurized inlet air for flow into the high pressure chamber;

(d) selectively heating and cooling the inlet air;

(e) exhausting the pressurized air from the high pressure chamber through a plurality of vents in the second enclosure; and (f) directing jets of the pressurized air from the high pressure chamber into the low pressure chamber through a plurality of spaced orifices in the first enclosure such that the pressurized air jets vigorously impinge on the outer surface of the equipment;

(g) measuring the temperature of the air in the high pressure chamber and generating a first signal proportional thereto;

(h) measuring the heat transfer coefficient at a plurality of locations on the outer surface of the equipment and generating a second signal proportional thereto; and (i) comparing the first and second signals with known information concerning the temperature and heat transfer properties of the equipment if airborne; and (j) operating the flow producing means and the temperature control means until the first and second signals conform to the known information;

whereby the aerodynamic heating and cooling effects of the air stream on the equipment are accurately simulated for the specified operating flight conditions.

11. A method as set forth in claim 10 wherein step (a) includes the step of:

(k) substantially uniformly spacing the first enclosure from the equipment a distance generally in the range of ¾ inches to 1¼ inches.

12. A method as set forth in claim 10 wherein the orifices of step (f) have a projected area in the general range of 1/64 square inches to 1/100 square inches and have a center to center spacing between adjacent orifices in the general range of ¾ inches to 1¼ inches.

* * * * *